W. M. CONGER.
Water Filters.

No. 136,364.

Patented March 4, 1873.

Witnesses:
A. Hörmann.
W. C. Dey.

Inventor
W. M. Conger,
by his attorney

UNITED STATES PATENT OFFICE.

WALTER M. CONGER, OF NEWARK, NEW JERSEY, ASSIGNOR TO HIMSELF, JAMES NOON, AND JOHN NOON, OF SAME PLACE.

IMPROVEMENT IN WATER-FILTERS.

Specification forming part of Letters Patent No. 136,264, dated March 4, 1873.

*To all whom it may concern:*

Be it known that I, WALTER M. CONGER, of Newark, Essex county, New Jersey, have invented certain Improvements relating to Water-Filters, of which the following is a specification:

The invention is intended more especially for use in the cellars of houses to filter all the water which passes to the culinary departments of the house. The connections are preferably formed so that the water to the wash-tubs, bathing apparatus, water-closets, &c., may pass always through an independent pipe. The object of the invention is to provide conveniently for the cleansing of the filter and all the parts thereof by a reversion of the current at will, and to provide for the entire removal of the filter at long intervals to allow the materials to be exchanged. In a house having a water-back in the cooking-range it is important to make the supply of water thereto continuous. I have provided for attaining this end while the filter is being cleansed or renovated.

The following is a description of what I consider the best means of carrying out the invention. The accompanying drawing forms a part of this specification.

Figure 1:
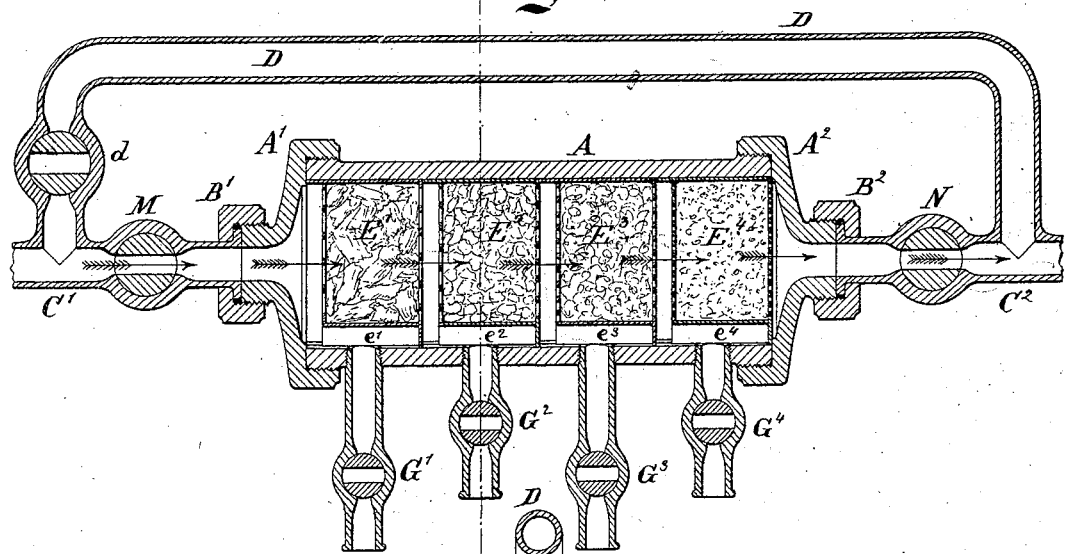
Figure 2:
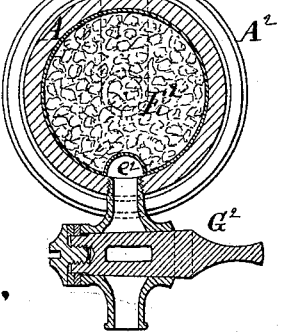
Figure 3:
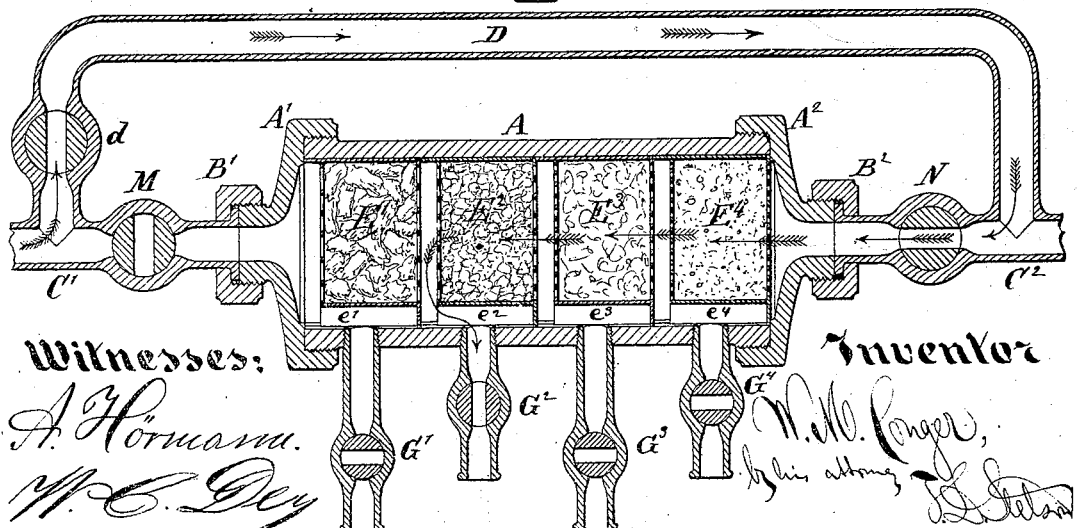

Figure 1 is a central vertical section, showing the filter in use; Fig. 2, a cross-section; and Fig. 3 is a section, showing the filter in the act of being cleaned by the back current flowing through a portion of the filtering material and downward through the portion of the base which is in communication with the cock, which is open below.

Similar letters of reference indicate like parts in all the figures.

A is a hollow cylindrical casing, threaded at and near its ends, and $A^1$ $A^2$ are heads screwed thereon, equipped with concentric nozzles, threaded to receive the screw-couplings $B^1$ $B^2$, mounted on the ends of the fixed pipes $C^1$ $C^2$, as shown. D is a pipe, which extends around and is adapted to form a connection at will between the pipes $C^1$ $C^2$ independently of the casing A and its contents. The passage through the pipe D is controlled by a cock, $d$, which, when the filter is in operation, is tightly closed. M and N are stop-cocks, mounted as represented. To remove the filter altogether and exchange its contents, the cock $d$ is opened and the cocks M and N closed, and the couplings or unions $B^1$ $B^2$ are unscrewed. The casing A with its contents and connections, including the ends $A^1$ $A^2$, is then removed and another similar one with fresh filling may be substituted; or the contents of the casing A may be emptied and its filling renewed. In either case the reverse of the several operations restores the filtering action again, and in the meantime the house is supplied through the pipe D without a moment's interruption.

The interior of the casing A is divided by perforated metallic casings into a number of subdivisions, which I will term chambers. The construction of the sheet-metal casings is peculiar. Each is mainly cylindrical in form with flat ends, but there is a longitudinal groove along one side of each, produced by forcing inward or indenting the metal. The metal casings for the several chambers are alike, but they are differently filled. The casing in the first chamber $E^1$ contains broken charcoal. The casing in the second, $E^2$, contains a finer grade of the same purifying material. The casing $E^3$ contains sponge, and the casing $E^4$ sand. Each of the metal casings is so placed that the groove comes on the under side. The heads are sunk a little ways into each of the cylindrical casings, so that there shall be a little space between the head of each case and the adjacent head of the neighboring case. The drain-cocks $G^1$ $G^2$ $G^3$, &c., are set in the under side of the casing A so as to communicate with the groove in the base of each of the several chambers. It should be understood that the groove does not extend the whole length of each of the metal casings, but is closed at one end—that is to say, one end of each metal casing, which forms the main chamber, is a complete cylinder. The other end and the main body of the casing is a cylinder with the exception of the groove.

Such a complete renovation as is above described need occur only at long intervals. At shorter intervals the filter may be cleansed by reversing the current through it. To effect this, the cock $d$ is opened and the cock M closed. Thus conditioned, the pipe D will continue to supply the house, while by opening the several cocks $G^1$ $G^2$ in succession the several chambers $E^1$ $E^2$, and consequently the entire interior of the filter, will be cleansed by a backward rush of the water. The water flows backward through the cock N, and through such of the chambers $E^1$ $E^2$ as intervene between it and the drain-cock, which is then open. By opening the drain-cocks successively a tolerably clean condition is induced in the filter by a few seconds' backward flow of the water, and then the drain-cocks being all closed the cock M is again opened and the cock $d$ closed, and the filtering goes on as before.

To avoid multiplicity of letters we may refer, without confusion, to the metallic casings by the same letters, $E^1$ $E^2$, which have been before used for the chambers, and to the groove in the bottom of each by the letters $e^1$ $e^2$. When reference is made to the several parts as chambers it includes the entire space occupied not only by the contents of the metallic casing, but by the groove below and by the cavity which exists outside of the heads and between it and the next metallic casing. This latter space allows a free chance for the dirt to sink into the groove below. It and the connecting groove below form a part of each chamber, which serves a very different function from the filtering part. It serves as a conveniently-arranged and easily-cleanable side passage in which the foreign matter is allowed to accumulate, and from which, by the connected drain-cock, it may be conveniently removed when desired.

The several metallic casings $E^1$ $E^2$, &c., are intended to be exactly alike, and the bore of the chambers exactly correspond to the cylindrical interior of the casing A, care being taken in the manufacture of the filters that all these nicely correspond. The renovation of the filter may be accomplished with very little labor or delay by simply pushing out the several chambers and substituting new ones.

I claim as my invention—

1. In a water-filter, the stop-cock N, arranged as shown relatively to the independent connecting-pipe D, filter-case A $A^1$ $A^2$, and fixed pipe $C^1$ $C^2$, so that the filter-case may be removed at will without stopping off the water from the consumer.

2. In combination with the connecting-pipe D and proper controlling means $d$, the series of separately-removable filtering means $E^1$ $E^2$, &c., mounted in a tightly-inclosing case, A, with channels $e^1$ $e^2$ and cocks $G^1$ $G^2$ arranged to allow a reversion of the current through the whole or any part of the same at will, and to provide for a separate cleansing of each filter-chamber and each drain-channel, as herein specified.

In testimony whereof I have hereunto set my hand this 21st day of September, 1872, in the presence of two subscribing witnesses.

WALTER M. CONGER.

Witnesses:
HENRY J. MILLS,
LANGDON H. GILMOR.